US010751752B2

(12) United States Patent
Agro et al.

(10) Patent No.: US 10,751,752 B2
(45) Date of Patent: Aug. 25, 2020

(54) METHOD OF INCREASING SURFACE ADHESION OF AN ARCHITECTURAL METAL FINISH

(71) Applicant: Permasteelisa North America Corp., Windsor, CT (US)

(72) Inventors: Susan Agro, Somers, CT (US); Sandor Erdei, Southington, CT (US); Douglas Walker, Red Bank, NJ (US)

(73) Assignee: Permasteelisa North America Corp., Windsor, CT (US)

( * ) Notice: Subject to any disclaimer, the term of this patent is extended or adjusted under 35 U.S.C. 154(b) by 305 days.

(21) Appl. No.: 15/783,794

(22) Filed: Oct. 13, 2017

(65) Prior Publication Data

US 2018/0104717 A1 Apr. 19, 2018

Related U.S. Application Data

(60) Provisional application No. 62/407,864, filed on Oct. 13, 2016.

(51) Int. Cl.
*B05D 3/08* (2006.01)
*B05D 5/10* (2006.01)
*B05D 5/08* (2006.01)
*B05D 3/14* (2006.01)
*C09J 5/02* (2006.01)
*F16B 11/00* (2006.01)

(52) U.S. Cl.
CPC ............ *B05D 3/08* (2013.01); *B05D 3/148* (2013.01); *B05D 5/083* (2013.01); *B05D 5/10* (2013.01); *C09J 5/02* (2013.01); *B05D 2202/25* (2013.01); *C09J 2400/163* (2013.01); *C09J 2427/006* (2013.01); *C09J 2427/008* (2013.01); *F16B 11/006* (2013.01)

(58) Field of Classification Search
None
See application file for complete search history.

(56) References Cited

U.S. PATENT DOCUMENTS

| 6,780,519 | B1 | 8/2004 | Strobel et al. | |
|---|---|---|---|---|
| 2006/0163766 | A1 | 7/2006 | Yasuhiro | |
| 2007/0193205 | A1* | 8/2007 | Hill | C25D 11/18 52/745.15 |
| 2012/0003435 | A1* | 1/2012 | Kameyama | C09D 11/101 428/195.1 |
| 2013/0280412 | A1* | 10/2013 | Sandstrom | B29C 59/08 427/8 |

* cited by examiner

Primary Examiner — Shamim Ahmed
Assistant Examiner — Bradford M Gates
(74) Attorney, Agent, or Firm — DLA Piper LLP (US)

(57) ABSTRACT

A method for modifying the surface of an architectural finish for a metal structure that increases its surface energy to almost double the surface energy obtained by the methods currently being performed, particularly in the curtain wall industry. Specifically, a flame plasma treatment process is applied to the surface of the finish in accordance with the disclosed principles to achieve the disclosed results.

16 Claims, 8 Drawing Sheets

METHOD OF INCREASING SURFACE ADHESION OF AN ARCHITECTURAL METAL FINISH

RELATED APPLICATION AND PRIORITY CLAIM

This application claims the benefit of U.S. Provisional Application No. 62/407,864, filed Oct. 13, 2016, which is hereby incorporated by reference in its entirety.

TECHNICAL FIELD

The disclosure generally relates to a method of increasing surface energy/adhesion of an architectural metal finish of a structure used in a curtain wall.

BACKGROUND

The curtain wall industry often utilizes aluminum frames/structures whose surfaces are coated finished to provide excellent appearance and structure protection (i.e., weatherproofing). This often involves an aluminum bar that has been extruded through a die where certain design specifications and characteristics are present, and applying decorative and protective finishes. Often a primer or etching material is used to enhance the bond strength between the substrate and finish. In more limited cases, but common in storefront applications, stainless steel is used which often requires special cleaning and priming steps.

In the curtain wall industry, it is required to have a high level of surface adhesion and/or bonding properties of the finished metal structures. ASTM C1401-7 is the standard guide for structural sealant glazing. Structural silicone adhesives have a good bonding affinity to glass because of similar chemistry, and also has a high expected bonding strength to metals, such as stainless steel or anodized aluminum. Aluminum structures with finishes, on the other hand, have a low surface energy if untreated.

A method of increasing surface energy/adhesion of architectural metal finishes in a curtain wall is desired and needed. In addition, some treatments such as stainless and anodized need surfaces properly cleaned of organic contaminants or residue salts from anodizing. Moreover, there is no currently accepted measurement method or indicator that may be used to forecast adhesion level after structural silicone curing other than destructive testing of the installed joint. Thus, there is a need and desire for a measurement method or indicator that may be used to forecast adhesion level after structural silicone curing.

SUMMARY

The disclosed embodiments relate to a method and an apparatus for increasing surface adhesion of architecturally coated surfaces for improving the subsequent structural sealant bonding of glass, metal or stone.

A method of increasing surface adhesion of an architectural metal finish of a curtain wall structure is provided. The method comprises generating a flame having first characteristics; applying the flame to a first portion of the metal finish for a predetermined dwell time, the flame being held at a predetermined distance from the metal finish as it is being applied to the metal finish; and determining whether there is tore metal finish to treat. If it is determined that there is more metal finish to treat, the method further comprises: moving the flame to a different portion of the metal finish, and applying the flame to the different portion of the metal finish for the predetermined dwell time while holding the flame at the predetermined distance from the metal finish as it is being applied to the metal finish.

A method of increasing surface adhesion of a PVDF (polyvinylidene fluoride) coated surface of a curtain wall structure is also provided. The method comprises: generating a flame having first characteristics; applying the flame to a first portion of the PVDF coated surface for a predetermined dwell time, the flame being held at a predetermined distance from the coated surface and being maintained in constant motion as it is being applied to the coated surface; and determining whether there is more surface to treat. If it is determined that there is more surface to treat, said method further comprises: moving the flame to a different portion of the PVDF coated surface, and applying the flame to the different portion of the PVDF coated surface for the predetermined dwell time while holding the flame at the predetermined distance from e coated surface and maintaining it in motion s it is being applied to the coated surface.

The following terms deal with adhesion basics. Adhesion—Adhesion is the process by which two surfaces are held together by interfacial forces (surface attraction) or mechanical interlocking.

Adhesive—An adhesive is a substance which is capable of holding materials together in a useful fashion by means of surface attraction. Surface attraction results from placing a thin layer of adhesive between two objects.

Bond Line—The bond line is the spacer or gap between two substrates which contains the adhesive.

Substrate—A substrate is a material which is held by an adhesive. Substrate is a generic term for the objects which are being bonded.

Surface—The surface of an object is the face of the object which is coated with adhesive.

The following terms deal with the Composition of an Adhesive (Adhesive Composition).

Activators—Activators are chemicals which can be applied directly to a surface or substrate or mixed with an adhesive to speed up the solidification of the adhesive. Activators are similar to both the curing agents and catalysts.

Catalysts/Accelerators—Catalysts, also called accelerators, are chemicals which, when added in small amounts, cause adhesives to solidify.

Curing Agents—A curing agent is a chemical which reacts with an adhesive polymer to cause it to solidify. Approximately equal amounts of adhesive resin and curing agent are mixed together to form a solid adhesive.

Miscellaneous Components—Some additional components that may be found in an adhesive include pigments, flame retardants, antifoam agents, and tougheners.

Plasticizers—A plasticizer is a chemical added to an adhesive to prevent it from becoming brittle. Many adhesive polymers are very strong, yet brittle enough to crack under impact. Plasticizers are added to soften the adhesive to keep it from becoming too brittle.

Polymers—Polymers are large chemicals composed of repetitive units. Polymers make up the largest portion of an adhesive.

Solvents—Solvents are liquids used to dissolve or suspend adhesives. Solvents are added to an adhesive formulation to make them fluid, allowing the adhesive to be spread or sprayed on a surface more easily. After the adhesive has been applied, the solvent evaporates during cure. Solvents are also used as thinners for some types of adhesives.

Tackifiers—A tackifier is a chemical which is added to an adhesive to make it "stickier". The tackifier holds the substrates together while curing is taking place. Not all adhesives contain tackifiers.

The following terms deal with the application and usable life of adhesives. Cure—When an adhesive cures, it is converted from a liquid to a solid state. The curing process may be accomplished by cooling, loss of solvents, or internal chemical reaction. Curing generally implies some type of physical or chemical change in the adhesive, while hardening or melting is reversible.

Green Strength—The green strength is a measure of the ability of the adhesive to support a load during the green time.

Green Time/(Open Time)—Green time is the time between application and solidification of the adhesive. During the green time, it is still possible to position parts. Fixturing time (the amount of time before bonded parts can be handled) is often somewhat longer than green time.

Kickover—Kickover is the sudden increase in viscosity which accompanies the curing of an adhesive. Once an adhesive "kicks over", it is almost in its solid state and can no longer be easily spread.

Pot Life—The pot life of an adhesive is the length of time it remains usable for mixing. Pot life is usually an important factor only with adhesives which are mixed together and begin curing almost immediately.

Rheology—Rheology is the ability of a material to flow and deform. Adhesives with good rheology flow easily and break cleanly at the end of a bead.

Shelf Life—Shelf life is the usable storage time of a material. Most adhesives have a shelf life of 6 to 12 months. The shelf life of an adhesive may be increased by refrigeration, and is usually shortened by exposure to heat.

Viscosity—Viscosity is the resistance to flow or degree of thickening of a fluid. Some adhesives flow very easily, whereas other types of adhesives are so thick they hardly flow at all. Water and thick putties represent the extremes of viscosity.

Wetting—Wetting is intimate contact of a liquid and a surface. Good wetting is only possible if there is good attraction between the surface and the liquid. Proper wetting of a mating surface is essential for good bonding.

DESCRIPTION OF DRAWINGS

Like reference symbols in the various drawings indicate like elements.

DETAILED DESCRIPTION

Figure 1:
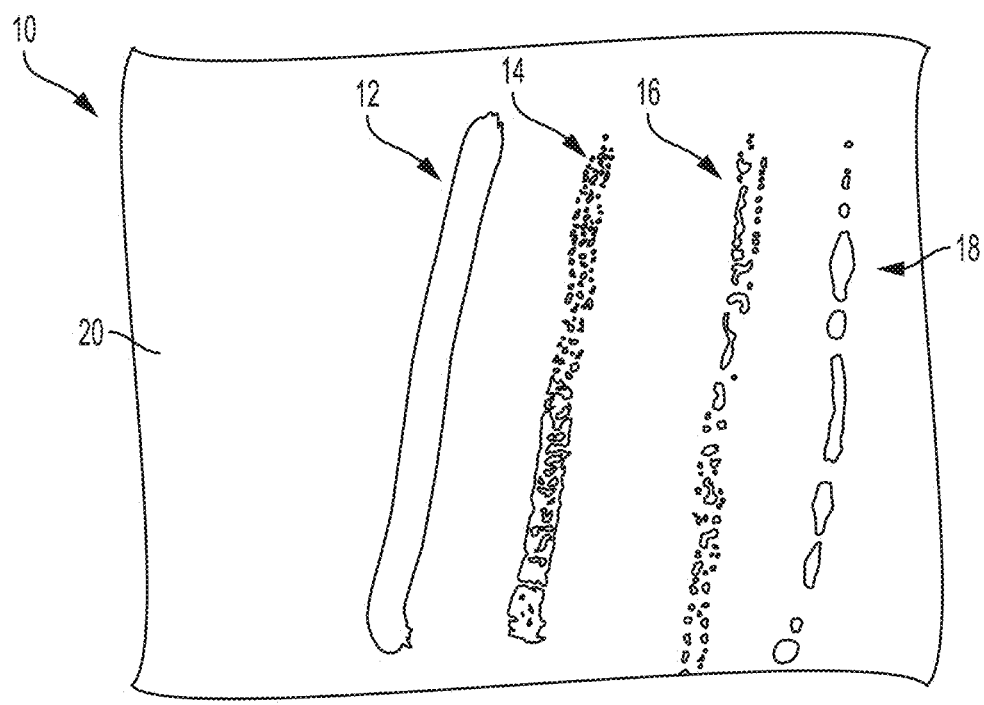
FIG. 1 illustrates the results of a test of a surface finish that was not flame treated in accordance with the disclosed principles.

Surface free energy directly correlates to wettability, and higher adhesion performance. Adhesion is a function of many variables, substrate material, substrate surface roughness, active surface area, surface energy, compatibility with adhesives, contamination (cleanliness), surface activation, temperature, humidity, adhesive viscosity, cleaner fluid chemistry, temperature, etc. Current cleaning methods contain significant opportunity for human errors, since the quantity of cleaner fluid, material shape, cleanliness of cloth/paper, pressure, and speed changes based on the individual's work habits. Quality tests performed on unitized curtain walls according to ASTM C 1135 and C194 are sampling processes and cannot pick up causes of adverse effects of insufficient cleaning because of human activities or other factors. An improvement of adhesion performance and adhesion uniformity on the entire structural bonding area is desired to eliminate human and other potential adverse effects on bonding. If adhesion performance significantly increases (for example, structural silicones with low adhesive performance, but high tensile strength and elasticity, etc.), quality, performance and safety in the application is increased. Better adhesion performance has a huge potential safety impact on the curtain wall industry, providing high level of quality assurance of structural silicone bonding.

Without any economic impact and effect, a safety performance increase itself justifies the utilization of increased wettability surface treatment for structural silicone metal construction components with architectural metal finishes (e.g., PVDF, Acrylic, or Polyester-based wet paint or powder coated applications). Proper metal surface pretreatment and organic coating application are critical to the performance of the SSG system since the interface between the coating and the metal surface is a critical link in the structural adhesion chain.

It is known that only the silicone structural sealant holds the insulated glass unit or spandrel panels in a non-load bearing curtain wall aluminum frame. Silicone has to hold the unit against wind, water, snow, ice, seismic movement, blast, and other design loads. Specific measurable physical characteristics are available for silicone rubber composition and behavior. However, adhesion is measured only as a ratio to cohesion (adhesion failure versus cohesion failure) in a distractive sampling test according to ASTM C749-15a. Because of the high uncertainty of adhesion, a high safety factor needs to be utilized in design (2.5× to as high as 5× safety). Enhanced adhesion can be utilized in many ways: Using it as elevated insurance if no manufacturing variables change; eliminating (decreasing) primer/activator use; eliminating (decreasing) chemical cleaning (IPA or other more hazardous solvents); verifying substrate condition using a simple inexpensive quantitative test (Dyne measurement); and/or decreasing the silicone adhesive design (bite) size.

It is known that surfaces can be prepared for bonding by one of three general methods: abrasion, cleaning or conversion. Abrasive surface preparing methods require the surface to be rubbed or struck with a hard, coarse material. The two most common types of abrasion preparation techniques are brushing and blasting. In a brushing operation, a coarse, stiff brush is used to rub the surface of a material, which is useful for small surface areas. Blasting or shot blasting, on the other hand, is used when cleaning a large surface area, or when considerable material must be cut away since the small, sharp pieces of the blast medium impact the surface.

Solvent cleaning and chemical cleaning are the two most common types of cleaning techniques used for surface preparation. In solvent cleaning, a solvent is applied to the surface to dissolve any contaminate material existing on the surface. This can be accomplished by any of the following methods: solvent dip, solvent wipe, vapor degreasing, or ultrasonic cleaning. Solvent cleaning methods tend to be more mild than the chemical cleaning methods.

In a solvent dipping operation, the object to be cleaned is immersed in a container of solvent, which dissolves and carries away the surface contaminants. This method is commonly used for oil- and grease-coated parts. A drawback of this method is that the solvent becomes contaminated. It is also not suitable for the large structures used in a curtain wall.

Solvent wiping consists of using a solvent-soaked material to wipe the surface of a part until it is clean and contaminants are removed. This method is very simple, economical, and widely used in the curtain wall industry. One drawback of using this method, however, is the contamination of the wipe rag, which must be monitored and changed frequently.

Vapor degreasing is usually used for parts that have crevices or intricate surface details, which may be difficult to clean with a rag. In vapor degreasing, a solvent is heated so the vapor comes in contact with the part to be cleaned. The vapor condenses on the part and the liquid that forms runs over the part, carrying the oil and grease back to a basin. The oil and grease settle to the bottom of the degreaser and the solvent is re-vaporized to repeat the process. Proper ventilation is essential when using a vapor degreaser.

In ultrasonic cleaning, high-frequency sound waves are used to vibrate dirt away. The part is immersed in a solvent, which is then vibrated by high frequency sound waves.

The current surface preparation process used in the curtain wall industry will now be explained. The substrate to be treated is an architectural finish for a metal structure. In the example embodiments and test discussed below, the architectural finish and structure are a PVDF coated (e.g., wet paint or powder coated) aluminum structure. It should be appreciated that the disclosed principles are not limited to a PVDF coated aluminum structure. The adhesive/sealant to be applied after the surface treatment could be structural silicone such as the silicone manufactured by SIKA (e.g., SIKASIL SG-500, SIKASIL SG-500CN, SIKASIL SG-550 SIKASIL SG-18, SG-20, etc.), Momentive (e.g., Ultraglaze 4400, 4600), or Dow Corning (e.g., 983, 993, and 3362), to name a few.

It is known that structural silicone glazing adhesives are condensation-curing, one- and two-part silicone products suitable for bonding glass panes into insulating glass or the entire insulating glass unit to a support frame. This technique is known as structural silicone glazing. Structural silicone glazing silicone adhesives have structural capabilities in the sense of industry standards such as e.g., EN13022/EOTA ETAG 002, ASTM C 1401 and GB 16776-2005 and are long-term UV-resistant. They have proven their suitability for structural silicone glazing in thousands of façade projects under most climatic conditions for over 40 years.

Moreover, joints must be properly dimensioned as changes are no longer possible after construction or adhesive application. The basis for the calculation of the necessary joint dimensions are the technical values of the adhesive materials to be bonded and the adjacent building materials, the exposure of the building elements, their construction and size as well as external loads (wind, snow, climatic, blast and seismic loads, etc.).

Surface pre-treatment and masking surfaces must be clean, dry and free from oil, grease and dust. Pre-treated surfaces cannot be contaminated during any phase of production. If contamination occurs, surfaces have to be pre-treated once again. One generally accepted cleaner fluid is 99% Isopropyl Alcohol (IPA). If necessary, an adhesion promoter chemical activator may be used in addition to IPA treatment.

The application of the IPA or other cleaners is now described. IPA is a solvent cleaning agent. Activators or primers are solvent-based cleaning agents with a small quantity of chemical additives (1-2%). The cleaners are applied by the "two-cloth method" as follows:
 a. Moisten a clean, dry, oil-free and lint-free cloth or paper with IPA (or another suitable cleaner) and rub it over the surface. The cloth or paper are turned over to expose a new surface, or replaced regularly, in order to avoid wiping residue back onto the surface.
 b. Then, the surface is wiped with a clean, dry, oil-free and lint-free cloth or paper. It is preferred not to wait until the IPA (or other cleaner) has evaporated from the surface because dissolved contaminants would be left behind.
 c. The procedure is repeated until the surface is clean.
 d. Drying time: The required minimum drying time at 5-40° C. (40-105° F.) is 2 minutes.
 e. If the cleaned parts cannot be bonded immediately, y must be protected against subsequent contamination.
 f. If more than eight hours (one work shift) has passed since the cleaning, the cleaning process should be repeated before bonding.

The requirements and process for the application of the activators/primers (e.g., Dow Corning primer) is now described:
 a. Apply masking tape to the surfaces next to the joint to keep excess primer and sealant off areas where they are not intended.
 b. Pour primer into a small, clean container and replace and tighten the cap on the primer can to prevent exposure to atmospheric moisture that will contaminate the primer. No more than a 10-minute supply should be poured into the container at a time to ensure that primer does not get contaminated.
 c. Depending on the substrate and job conditions, two different methods can be used to apply the primer. The preferred application is to dip a clean, dry, lint-free cloth into the small container of primer and gently wipe a thin film onto the surface. For "hard-to-get-to" areas and rough surfaces, the primer is applied in a thin film with a clean brush. Over-priming can cause adhesion loss between the sealant and the primer. If too much primer has been applied, a powdery, chalky, dusty film will form on the surface. Excess primer should be removed by dusting the joint with a clean, dry, lint-free cloth or a non-metallic bristle brush.

d. The primer is allowed to dry until all the solvent evaporates. This typically takes 5 to 30 minutes, depending upon the temperature and humidity.

e. Inspect the surface for dryness. If too much primer has been applied, a powdery, chalky, dusty film will form on the surface. In this case, remove excess primer with a clean, dry, lint-free cloth or a non-metallic bristle brush before applying sealant.

f. The surface is now ready for application of the sealant. The sealant must be applied the same day the surfaces are primed. Any surfaces primed, but not sealed on the same day must be covered to prevent contamination or re-cleaned and re-primed before applying the sealant.

It is known that Dyne test inks and fluids are used for the quick and easy measurement of surface energy or wetting tension. The inventors have determined that the substrate surface energy level before treatment of the PVDF surface is 29-32 Dyne/cm (+/−2). Specifically, a Dyne test was performed on a PVDF coated aluminum structure as follows:

a. Plastic masking film was removed from the visible surface.

b. IPA (99%) was used to clean surface from contamination (as described above).

c. Accudyne Dyne pens (with levels of 32, 40, 52, and 60) were used to measure surface energy level.

FIG. 1 illustrates the results 10 of a test (discussed below in more detail) of a coated structure 20 that was not flame treated in accordance with the disclosed principles (discussed below in more detail). As shown in FIG. 1, four Dyne pens were applied to the surface of the structure 20. The first pen had a level of 32 dyne/cm and yielded a result 12 with a wet film that did not experience beading. The second pen had a level of 40 dyne/cm and yielded a result 14 with a beaded film. The third pen had a level of 52 dyne/cm and yielded a result 16 with a more beaded film in comparison to result 14. The fourth pen had a level of 60 dyne/cm and yielded a result 18 with a much more beaded film than results 14 and 16. Accordingly, the surface energy of the structure 20 was measured as 32 dyne/cm. In a later test (not shown), a pen with a level of 36 dyne/cm was used, but that result also experienced beading; accordingly, the IPA cleaned surface has approximately a 32 dyne/cm energy level.

The IPA or activator primer treatment discussed above marginally increases the surface energy level of the PVDF coated structure. Often times, the measured increase is merely 0-4 dyne/cm. The results are just inside measurement tolerance range. That is, the surface energy measurement accuracy using calibrated test fluids and test pens is a nominal value +/−2 dyne/cm unit. If a surface is showing beading after two seconds of treatment using 34 dyne/cm fluid while showing wetting after two seconds of treatment using 33 dyne/cm,—because of test accuracy—it can be stated that tested surface has a surface energy of 33 (+/−2) dyne/cm or the surface energy is greater than 31, but less than 35 dyne/cm. As can be see, this process, while meeting minimum requirements of the curtain wall industry, does not result in substantially stronger wetting and adhesion properties of the treated structure. That is, when using an IPA or IPA based cleaner, the increase of surface energy falls within the accepted Dyne value deviation range (+ or −2). At best and only in certain instances, the surface energy may increase, at a maximum of, 4 Dyne levels with an IPA or IPA based cleaner. Only an increase of 4 or greater in Dyne Value is measurable due to the stratification of Dyne levels, which are 32, 36, 40, 44, 48, 52, 56 and 60. Even when using adhesion enhancers, such as primers, the wettability of the surface and subsequent surface energy increase is equivalent to that of an IPA or IPA based cleaner; i.e., the increase is negligible.

The disclosed embodiments provide a method for modifying the surface of a PVDF coated aluminum structure that increases its surface energy to 60 dyne/cm (+/−2), which is almost double the surface energy obtained by the methods currently being performed, particularly in the curtain wall industry. Specifically, a flame plasma treatment process is applied to the surface of the PVDF coated aluminum structure in accordance with the disclosed principles to achieve the disclosed results.

Referring to FIGS. 2 and 3A-3C, an example flame plasma treatment process 100 in accordance with the disclosed principles is applied to a PVDF coated aluminum structure 170. In one embodiment, the gas used is a mixture of methane, propane, butane and other hydrogen carbon fuels commercially available. For example, natural gas fuel or liquid propane (LP) could be used.

Figure 2:
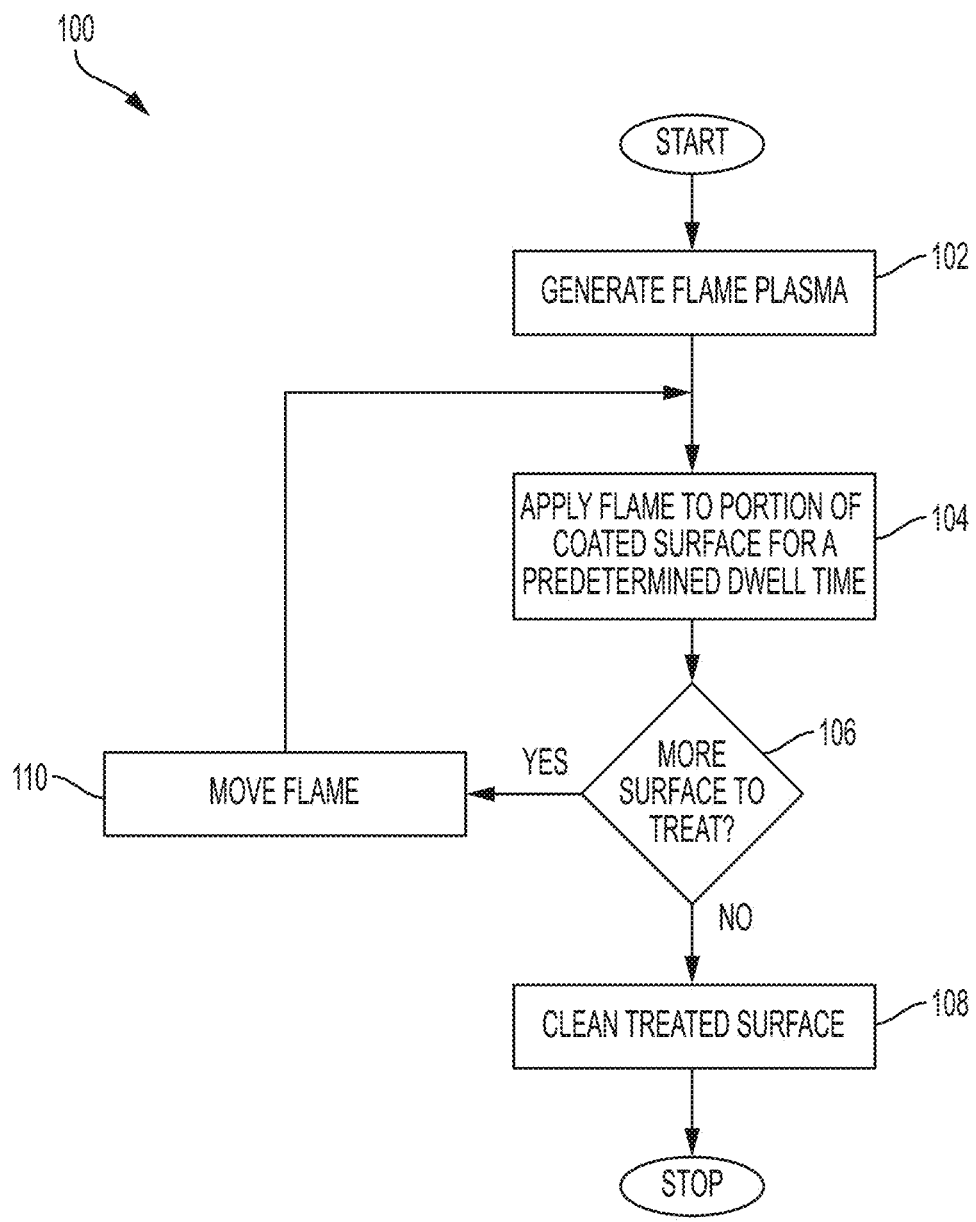
FIG. 2 illustrates an example flame plasma treatment process of a surface finish in accordance with the disclosed principles.
Figure 3A:
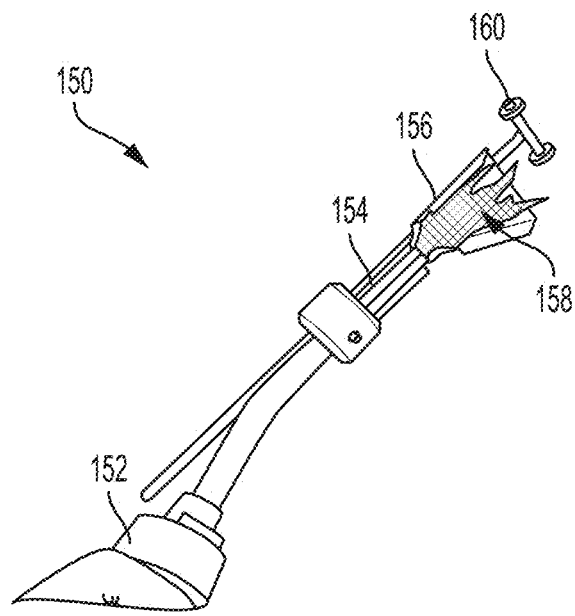
FIGS. 3A-3C illustrate an example embodiment of an apparatus used during the flame plasma treatment process illustrated in FIG. 2.

FIG. 3A illustrates the apparatus 150 used to carry out the process 100 illustrated in FIG. 2. The apparatus 150 includes a flame spreader 156 and guide 160 that are attached to a tip 154 of a torch 152 or other flame dispenser to assist with and ensure that a proper width flame 158 is consistently applied from the proper distance from the object being treated (e.g., in accordance with the example guidelines set forth below).

In one embodiment, the process 100 proceeds as follows. At step 102, a flame plasma is generated using e.g., a propane torch 150 (FIG. 3A) with a self-igniting handle. In the illustrated example, a 1.2 inch wide flame spreader 156 is used to create a uniform flat flame 158. During the process, the spreader 156 will turn orange due to the heat. Parameters and/or variables for the process 100 are discussed below. In addition, one or more of these parameters and/or variables can be modified to influence the treatment results.

At step 104, the flame 158 is applied to a portion of the PVDF coated surface of the structure 170 for a predetermined dwell time (discussed below) while constantly keeping the flame in motion. It should be appreciated that motion is necessary to eliminate concentrated heat on any particular spot to avoid burning the surface. Moreover, the PVDF maximum operation temperature is 150 degree Celsius (same as the EPDM (ethylene propylene diene monomer (M-class) rubber) or silicone rubbers' operation temperature). Accordingly, in the illustrated embodiment, the temperature must be kept below that level. In one embodiment the optimal temperature range is around 100 degrees Celsius. The flame treatment creates a wet gloss change to the surface of the structure 170 (i.e., greasy contaminants are melted, evaporated, ignited and burnt causing the visible change). After that change, the surface becomes a uniform matt color.

At step 106, it is determined whether there is more surface of the structure 170 to treat. If there is more surface to treat, the torch 150 and therefore its flame 158 is moved to a different location of the structure 170 and the process 100 continues at step 104. The flame is moved multiple times above the surface of the structure 170, without damaging the PVDF surface. It is desired that there be no residual discoloration of the PVDF surface. After the flame treatment, the surface becomes warm to the touch, but not hot enough to cause skin burning.

If at step 106, it is determined that there is no more surface of the structure 170 to treat, the treated surface is cleaned at step 108 and the process 100 is complete. In one embodiment, IPA is used to clean the surface to remove potential burn residues so that the surface looks clean after treatment.

Figure 3B:
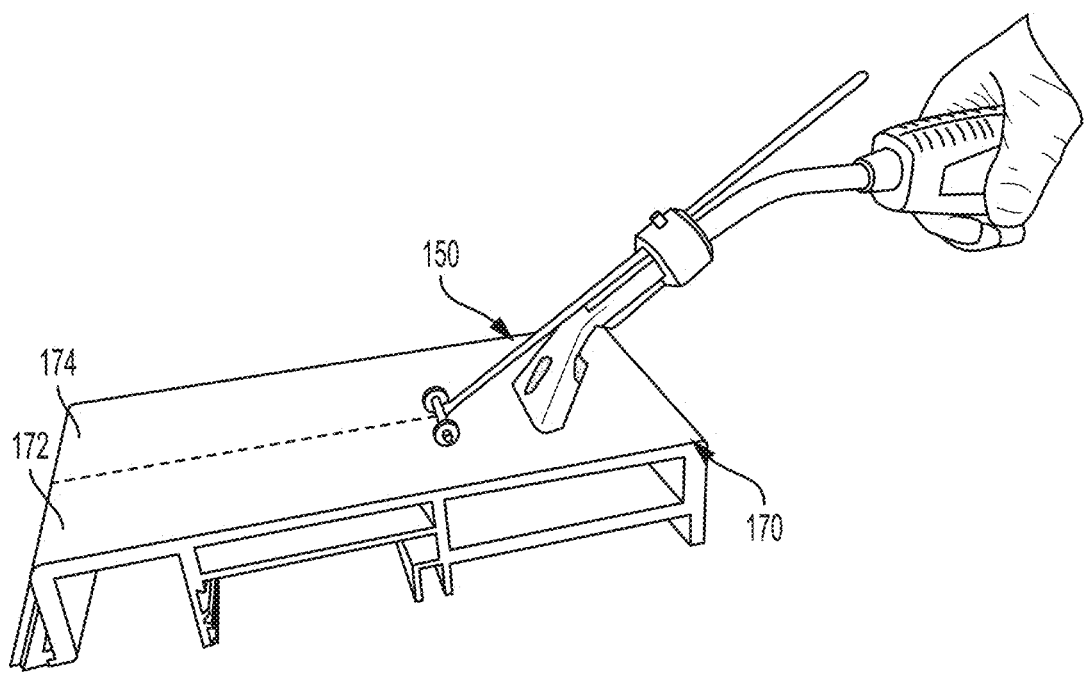
Figure 3C:
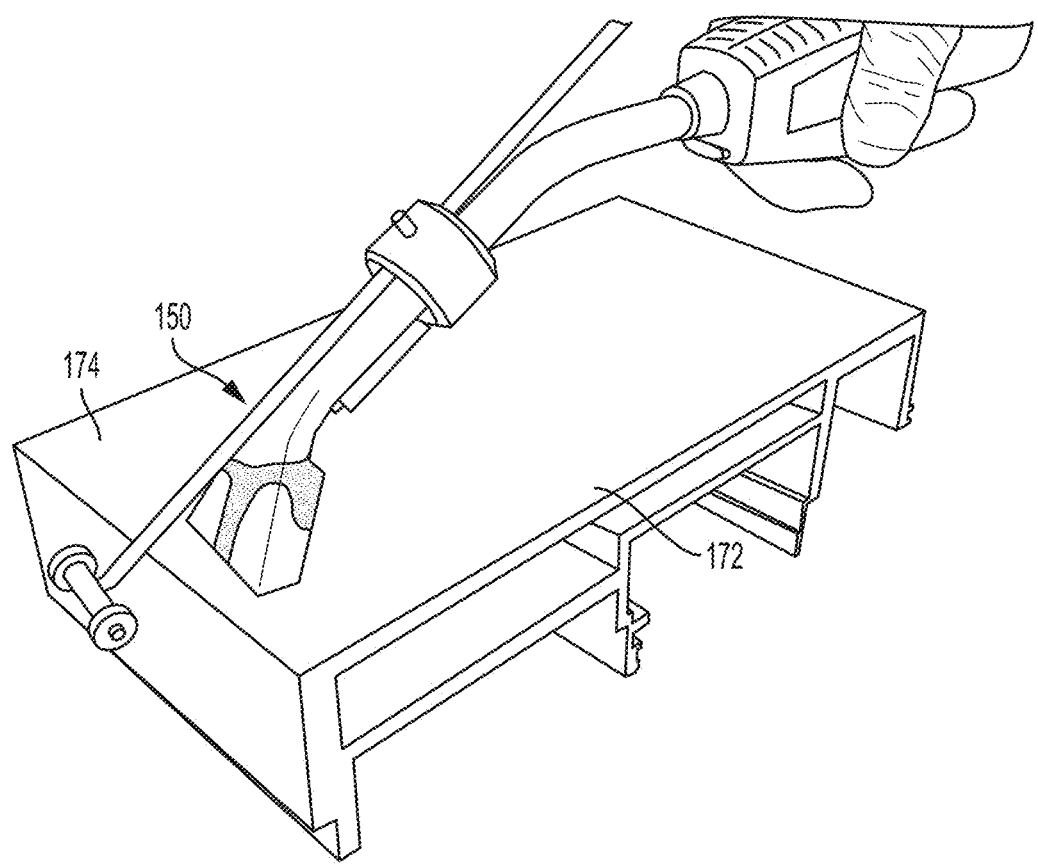

FIGS. 3B and 3C illustrate the flame treatment process 100 being applied to a structure 170. In the illustrated example, a first portion 172 of the structure 170 under goes the flame treatment process 100 while a second portion 174 does not. The second portion 174 was IPA cleaned as discussed above. In accordance with disclosed principles, and as illustrated in FIGS. 3B and 3C, the flame treatment moves down the first portion 172 of the structure after a predetermined flame dwell time elapses (e.g., in accordance with the example guidelines set forth below).

Figure 4:
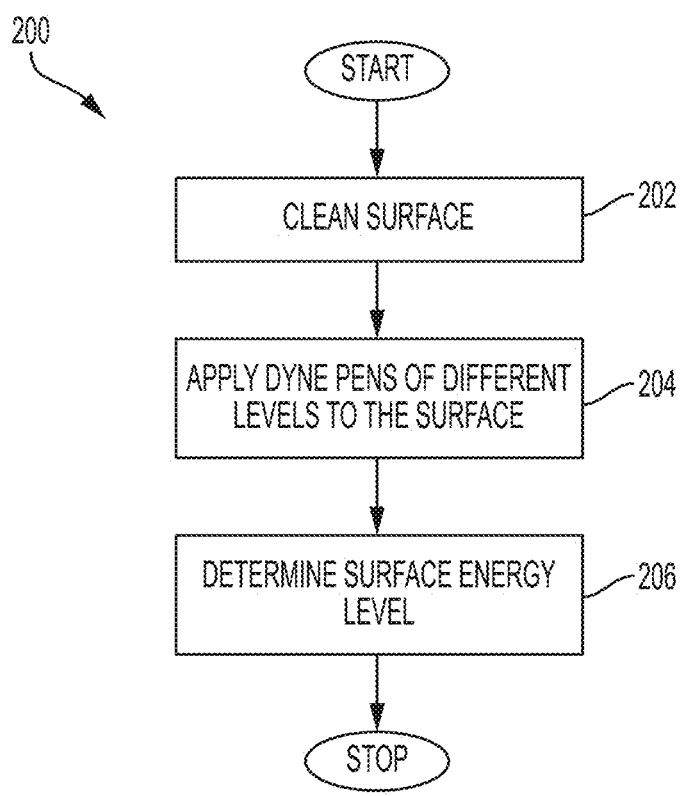
FIG. 4 illustrates an example test process that may be used to forecast adhesion level in accordance with the disclosed principles.

After the flame treatment process 100 was performed, a Dyne pen test was performed to determine the surface energy of the treated structure 170 (i.e., portion 172). It was observed that the surface energy of the treated PVDF coated aluminum structure increased to 60 dyne/cm (+/−2). FIG. 4 illustrates an example of the test process 200 in accordance with the disclosed principles.

As an initial matter, any plastic masking film used during the process 100 was removed from the visible surface of the structure 170. At step 202, the surface of the structure 170 is cleaned. In one embodiment, ISA (99%) may be used to clean the surface from contamination.

At step 204, Dyne pens having different levels are applied to different portions of the surface of the structure 170 to measure its surface energy level. In one embodiment, four Dyne pens are applied to the surface of the structure 170. In this embodiment, a first pen has a level of 32 dyne/cm, a second pen has a level of 40 dyne/cm, a third pen has a level of 52 dyne/cm and a fourth pen has a level of 60 dyne/cm. At step 206, the surface energy level is determined by viewing the results of each applied Dyne pen. That is, the highest dyne/cm level result that does not experience beading is determined to be the surface energy level.

Figure 5:
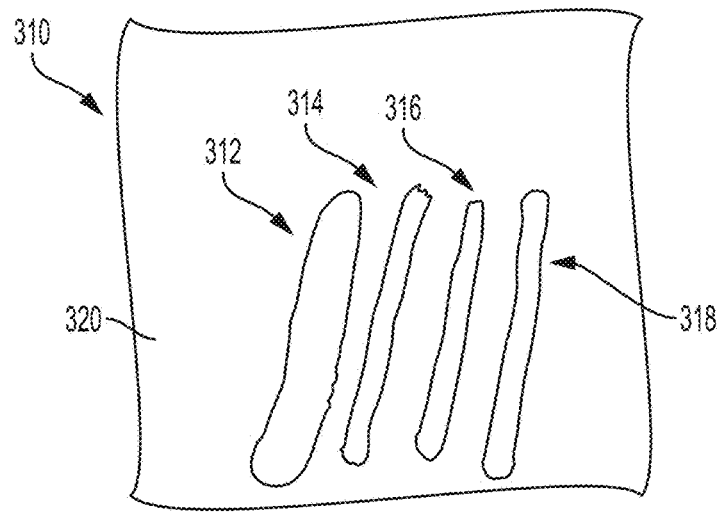
FIG. 5 illustrates the results of a test of a surface finish that was flame plasma treated in accordance with the disclosed principles.

FIG. 5 illustrates the results 310 of the test process 200 on the flame treated portion 172 of the structure 170 illustrated in FIGS. 3A-3C. As shown in FIG. 5, four Dyne pens were applied to the surface of the flame treated portion 172 of the structure 170. The first pen had a level of 32 dyne/cm and yielded a result 312 with a wet film that did not experience beading. The second pen had a level of 40 dyne/cm and yielded a result 314 with a wet film that did not experience beading. The third pen had a level of 52 dyne/cm and yielded a result 316 with a wet film that did not experience beading. The fourth pen had a level of 60 dyne/cm and yielded a result 318 with a wet film that did not experience beading. Accordingly, the surface energy of the flame treated portion 172 of the structure 170 is determined to be 60 dyne/cm. That is, the surface energy is determined to be 60 dyne/cm because there was no beading in any of the levels tested (i.e., the 32, 40, 52 and 60 level Dyne pens wet the surface of the flame treated portion 172 of the structure 170 without beading).

Figure 6:
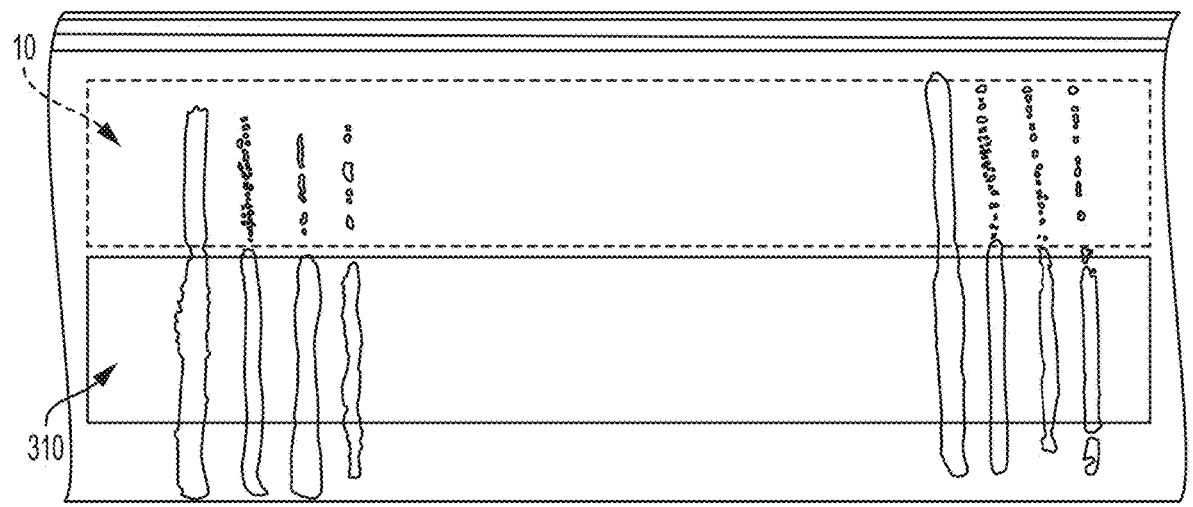
FIG. 6 illustrates a comparison test results of a surface finish that was not flame plasma treated in accordance with the disclosed principles and a surface finish that was flame plasma treated in accordance with the disclosed principles.

FIG. 6 is a comparison that shows the dyne level increase after the novel plasma treatment on the PVDF coated aluminum extrusion. The top rectangle shows the results 10 (FIG. 1) of the test process 200 when the structure's surface was not treated by the disclosed flame treatment process 100. The bottom rectangle show the results 310 (FIG. 5) of the test process 200 when the structure's surface was flame plasma treated in accordance with the disclosed principles. As discussed above with respect to FIGS. 1 and 5, the illustrated test result strips are 32, 40, 52, and 60 dyne/cm Dyne pen strips. On the treated surface, and as shown by result 310, all of the test result strips show wetting, which is desired. On the untreated surface, and as shown by result 10, only the test result strip associated with the 32 dyne/cm Dyne pen shows wetting—with all other test strips show beading, which is not desired. Therefore, the surface energy of the untreated PVDF coated aluminum structure is approximately 32 dyne/cm, while the flame plasma treated surface energy is 60+ dyne/cm.

Although surface energy is no guarantee of an increased adhesion level (it is just one of the variables for adhesion), the inventors have determined that keeping all other variables constant (such as e.g., environmental conditions, silicone adhesive chemistry, applied silicone quantity, mixing, tooling, curing etc.), a consistent significant increase of adhesion quality is experienced, with great correlation to surface energy level.

An adhesion test and comparison was also performed on the first and second portions 172, 174 of the structure 170. To test adhesion, SIKA silicon strips 402, 404 (FIGS. 7-9) were applied to the first and second portions 172, 174 of the structure 170. The silicon strips 402, 404 were allowed to cure for 24 hours.

Figure 7:
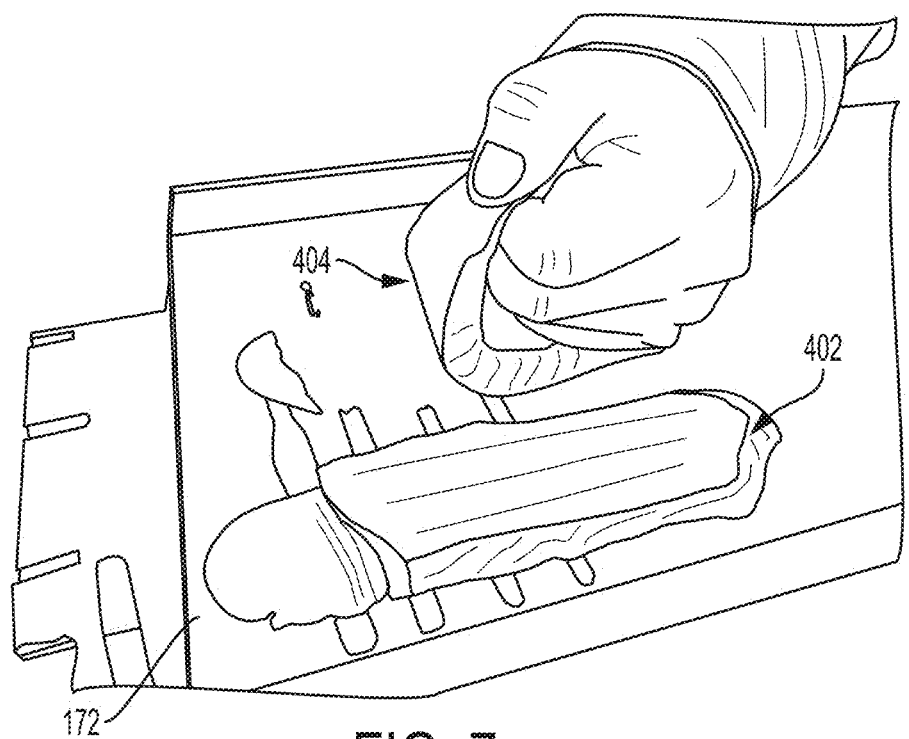
FIG. 7 illustrates the poor adhesion of silicon to a surface finish that was not flame plasma treated in accordance with the disclosed principles.

FIG. 7 illustrates the poor adhesion of the silicon strip 404 to the second portion 174 of the coated structure 170 (i.e., the portion 174 of the structure 170 that was not flame plasma treated in accordance with the disclosed principles). As can be seen in FIG. 7, the silicon strip 404 was easily removed by hand from the second portion 174 of the structure 170.

Figure 8:
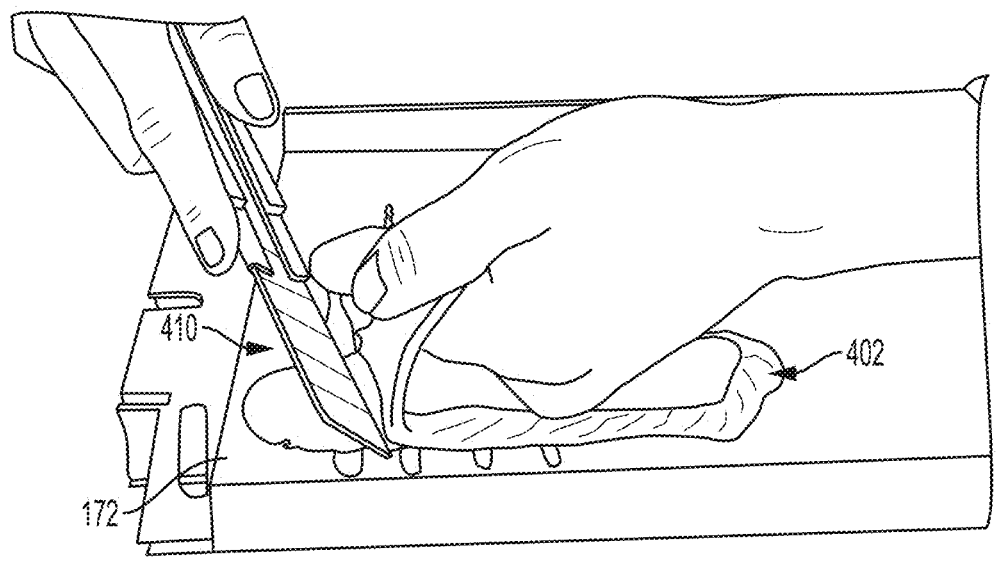
FIG. 8 illustrates the much improved adhesion of silicon to a surface finish that was flame plasma treated in accordance with the disclosed principles.

FIG. 8, on the other hand, illustrates the much improved adhesion of silicon strip 402 to the first portion 172 of the coated structure 170 (i.e., the portion 172 of the structure 170 that was flame plasma treated in accordance with the disclosed principles). As can be seen in FIG. 8, the silicon strip 402 required the use of a utility knife 410 for it to be removed from the first portion 172 of the structure 170.

Figure 9:
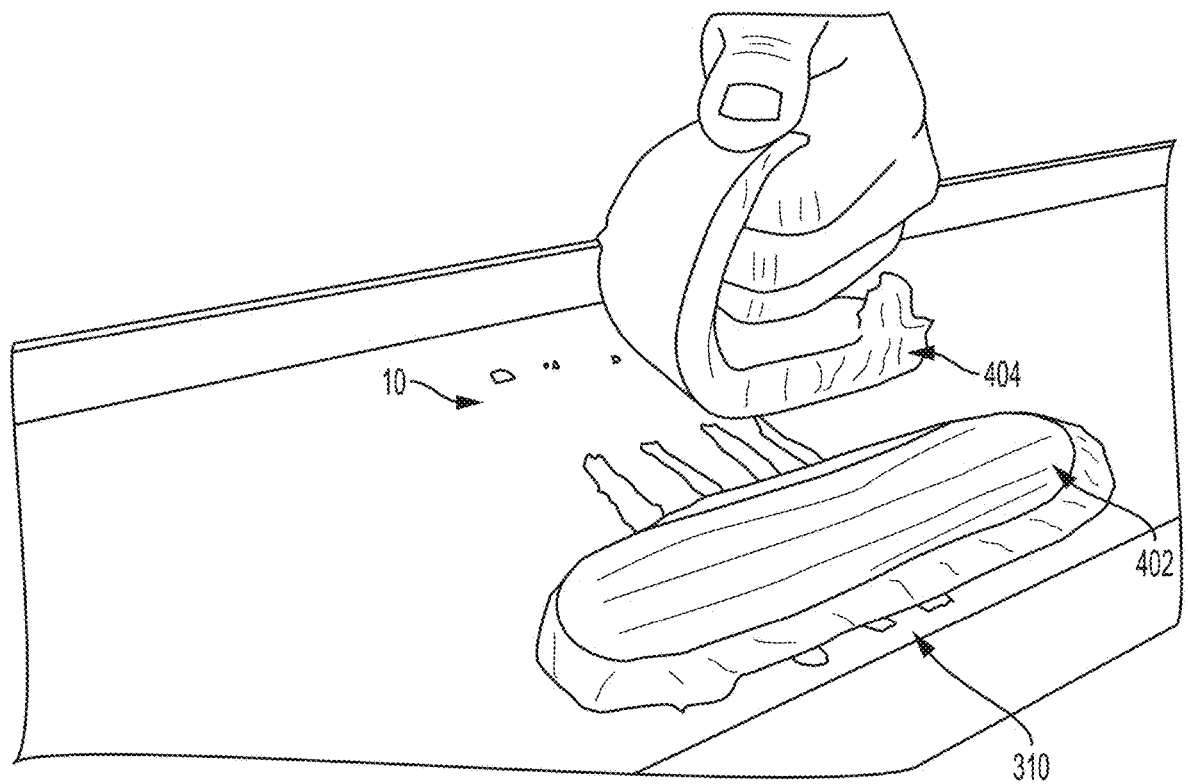
FIG. 9 illustrates the correlation between low surface energy and poor adhesion of untreated surface versus the high surface energy and improved adhesion of a surface treated in accordance with the disclosed principles.

FIG. 9 illustrates the correlation between low surface energy (result 10) and poor adhesion (silicon strip 404) of the untreated portion 174 of the coated structure 170 versus the high surface energy (result 310) and improved adhesion of the treated portion 172 of the structure 170 in accordance with the disclosed principles.

Thus, in accordance with the disclosed principles, the surface of the flame plasma treated PVDF coated aluminum extrusion shows significantly increased surface energy level (i.e., translated to significantly increased adhesion level). Moreover, the Dyne pen/Dyne fluid measurement is a great predictor of future/cured adhesion level, if there is a difference between the before treatment/after treatment conditions (i.e., if the delta is greater than 10-20 Dyne/cm).

It should be appreciated that the above-described flame plasma treatment process 100 has many variables that can be modified to influence the treatment results. For example, the following variables can be optimized to achieve the desired 60+ dyne/cm surface energy level, with minimized dwell time, for a project specific coated structure:
  i. Air/Gas ratio (e.g., 8-12 Air to 1 Gas)
  ii. Process gas pressure and flow rate (e.g., 75-115 PSI Air 0.75-1.5 PSI Fuel)
  iii. Flame chemistry (e.g., high oxygen content 0.1-1%)
  iv. Flame temperature (e.g., 1000-2000 Celsius)
  v. Flame distance from object (e.g., ½" to 4", or 12-100 mm)
  vi. Dwell time (line speed) (e.g., 0.2-10 seconds). Dwell time is a function of all other variables. It is chosen to achieve a 60+ Dyne value on specific finish.

It should be appreciated that the disclosed embodiments are not limited to PVDF coated surfaces and can be applied to other architectural metal finishes including powder coated surfaces, anodized, stainless and/or other treatments. The disclosed principles can be used with many types of metals and are not limited to use with the example embodiment that was described with reference to an aluminum structure. That is, the disclosed principles can be used to increase the surface energy/adhesion of a PVDF coated, stainless steel or anodized surface of a structure used in a curtain wall.

The foregoing examples are provided merely for the purpose of explanation and are in no way to be construed as limiting. While reference to various embodiments is made, the words used herein are words of description and illustration, rather than words of limitation. Further, although reference to particular means, materials, and embodiments are shown, there is no limitation to the particulars disclosed herein. Rather, the embodiments extend to all functionally equivalent structures, methods, and uses, such as are within the scope of the appended claims.

Additionally, the purpose of the Abstract is to enable the patent office and the public generally, and especially the scientists, engineers and practitioners in the art who are not familiar with patent or legal terms or phraseology, to determine quickly from a cursory inspection the nature of the technical disclosure of the application. The Abstract is not intended to be limiting as to the scope of the present inventions in any way.

What is claimed is:

1. A method of increasing surface adhesion of an architectural metal finish of a curtain wall structure, said method comprising:
    generating a flame having first characteristics;
    applying the flame to a first portion of the architectural metal finish for a predetermined dwell time, the flame being held at a predetermined distance from the metal finish as it is being applied to the metal finish;
    determining whether there is more metal finish to treat; and
    if it is determined that there is more metal finish to treat:
    moving the flame to a different portion of the metal finish, and
    applying the flame to the different portion of the metal finish for the predetermined dwell time while holding the flame at the predetermined distance from the metal finish as it is being applied to the metal finish,
    wherein the first characteristics comprise a gas pressure of 75 to 115 PSI air and 0.75 to 1.5 PSI fuel.

2. The method of claim 1, wherein the metal finish is a polyvinylidene fluoride (PVDF) coated surface and the first and different portions of the PVDF coated surface have a surface energy level of approximately 60 dyne/cm at a completion of the method.

3. The method of claim 1, wherein the metal finish is a polyvinylidene fluoride (PVDF) coated surface on an aluminum curtain wall structure.

4. The method of claim 1, wherein the first characteristics of the flame are modified by changing one or more of an air to gas ratio of an apparatus generating the flame, a process gas pressure, flow rate, flame chemistry, or flame temperature.

5. The method of claim 1, wherein the first characteristics further comprise an air to gas stoichiometric ratio of 8 to 12 air to 1 gas.

6. The method of claim 1, wherein the first characteristics further comprise a flame temperature of 1000 to 2000 degrees Celsius.

7. The method of claim 1, wherein the predetermined distance is within a range of 12 to 100 millimeters.

8. The method of claim 1, wherein the predetermined dwell time is within 0.2 to 10 seconds.

9. The method of claim 1, wherein a temperature of the metal finish is maintained below 150 degrees Celsius.

10. A method of increasing surface adhesion of a polyvinylidene fluoride (PVDF) coated surface of a curtain wall structure, said method comprising:
    generating a flame having first characteristics;
    applying the flame to a first portion of the PVDF coated surface for a predetermined dwell time, the flame being held at a predetermined distance from the coated surface and being maintained in constant motion as it is being applied to the coated surface;
    determining whether there is more surface to treat; and
    if it is determined that there is more surface to treat:
    moving the flame to a different portion of the PVDF coated surface, and
    applying the flame to the different portion of the PVDF coated surface for the predetermined dwell time while holding the flame at the predetermined distance from the coated surface and maintaining it in motion as it is being applied to the coated surface,
    wherein the first characteristics comprise a gas pressure of 75 to 115 PSI air and 0.75 to 1.5 PSI fuel.

11. The method of claim 10, wherein the first characteristics of the flame are modified by changing one or more of an air to gas ratio of an apparatus generating the flame, a process gas pressure, flow rate, flame chemistry, or flame temperature.

12. The method of claim 10, wherein the first characteristics further comprise an air to gas stoichiometric ratio of 8 to 12 air to 1 gas.

13. The method of claim 10, wherein the first characteristics further comprise a flame temperature of 1000 to 2000 degrees Celsius.

14. The method of claim 10, wherein the predetermined distance is within a range of 12 to 100 millimeters.

15. The method of claim 10, wherein the predetermined dwell time is within 0.2 to 10 seconds.

16. The method of claim 10, wherein a temperature of the coated surface is maintained below 150 degrees Celsius.

* * * * *